(12) United States Patent
Kim et al.

(10) Patent No.: US 8,917,799 B2
(45) Date of Patent: Dec. 23, 2014

(54) EDGE EQUALIZER

(75) Inventors: Hyungjin Kim, Carlsbad, CA (US); Sridhar Ramesh, Carlsbad, CA (US); Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 89 days.

(21) Appl. No.: 12/905,434

(22) Filed: Oct. 15, 2010

(65) Prior Publication Data

US 2011/0170587 A1 Jul. 14, 2011

Related U.S. Application Data

(60) Provisional application No. 61/255,447, filed on Oct. 27, 2009.

(51) Int. Cl.
*H03K 9/00* (2006.01)
*H04L 27/00* (2006.01)
*H04L 25/03* (2006.01)
*H04L 25/02* (2006.01)

(52) U.S. Cl.
CPC ...... *H04L 25/0204* (2013.01); *H04L 25/03828* (2013.01); *H04L 25/0232* (2013.01); *H04L 25/022* (2013.01)
USPC ....................................................... 375/316

(58) Field of Classification Search
USPC ................................. 375/260, 163
See application file for complete search history.

(56) References Cited

U.S. PATENT DOCUMENTS

| | | | |
|---|---|---|---|
| 6,192,040 B1 * | 2/2001 | Jalloul et al. | 370/335 |
| 7,292,651 B2 | 11/2007 | Li | |
| 2005/0265490 A1 | 12/2005 | Sestok, IV et al. | |
| 2006/0062322 A1 * | 3/2006 | Namgoong et al. | 375/285 |
| 2007/0036232 A1 * | 2/2007 | Hayashi | 375/260 |
| 2008/0144730 A1 | 6/2008 | Akella et al. | |
| 2008/0198942 A1 * | 8/2008 | Akella et al. | 375/260 |

FOREIGN PATENT DOCUMENTS

WO   WO 2011/053608 A1   5/2011

OTHER PUBLICATIONS

International Search Report and Written Opinion for PCT Application No. PCT/US2010/054168, 13 pages.
International Preliminary Report on Patentability with Written Opinion for PCT Application No. PCT/US2010/054168, mailed May 20, 2012; 5 pages.

* cited by examiner

*Primary Examiner* — Tanmay Shah
(74) *Attorney, Agent, or Firm* — Kilpatrick Townsend & Stockton LLP

(57) ABSTRACT

To compensate for roll-off while estimating a communication channel, an estimate of the channel is provided using a signal transmitted via the communication channel. The pilot tones positioned along the edges of the estimated channel are divided by the corresponding pilot tones of the received signal to generate a first number of ratios. An algorithm is thereafter applied to the first number of ratios to generate a second number of ratios associated with the non-pilot tones positioned along the edges of the estimated channel. Next, numbers that are inverse of the first and second number of ratios are applied to the pilot and non-pilot tones positioned along the edges of the estimated channel to compensate for the roll-offs in the estimated channel.

8 Claims, 2 Drawing Sheets

EDGE EQUALIZER

CROSS-REFERENCES TO RELATED APPLICATIONS

The present application claims benefit under 35 USC 119 (e) of U.S. provisional application No. 61/255,447, filed Oct. 27, 2009, entitled "Edge Equalizer," the content of which is incorporated herein by reference in its entirety.

BACKGROUND OF THE INVENTION

The present invention relates to wireless communication systems, and more particularly to estimating the channel in such systems.

To decode symbols in an OFDM system, the channel response is often estimated in the frequency domain. To achieve this, pilot tones (pilot subcarriers), known to the receiver, are transmitted. The pilot tones are also used to estimate the channel for non-pilot tones that contain modulated data. A number of well known techniques such as polynomial interpolation, filtering such as minimum mean square error (MMSE) filter or Wiener filter, or Fast Fourier transform (FFT) may be used to estimate the channel. Because an OFDM system has an FFT block, there are obvious cost/space advantages in using the existing FFT block to estimate the channel.

FIG. 1 shows a number of blocks of a channel estimation system 100 that uses FFT to estimate the channel. Inverse FFT block 102 receives pilots $S_1$ which have a higher density than the original pilots. A number of different interpolation techniques may be used to increase the density of pilots. Since pilots $S_1$ are not located at all the subcarriers, images appear in the output $S_2$ of inverse FFT block 102. Windowing and noise reduction block 104 is used to remove the images and reduce the noise present within the channel estimation window. The channel estimation window includes most of the channel energy. The noise may be reduced using any number of signal processing algorithms. Output signal $S_3$ of windowing and noise reduction block 104 is applied to FFT block 106, which in turn provides an estimate of the channel $S_4$ in frequency domain. The windowing and noise reduction performed by block 104 also causes loss of signal energy. This causes signal $S_4$ to have a roll-off near the edges of the signal band, in turn causing performance degradation. To achieve better performance, the roll-off near the edges of the signal band needs to be compensated. The roll-off may be reduced by increasing the channel estimation window. However, increasing the channel estimation window may further degrade the performance.

FIG. 2 shows a channel estimation system 100 coupled to an MMSE filter 120. Signal $S_5$ represents the pilot tones located near the edges of the signal band $S_1$. MMSE filter 120 is adapted to use signal $S_5$ to compensate for the roll-offs near the edges of the signal band. The channel estimates near the edges of signal $S_4$ are replaced by the output signal $S_6$ of MMSE filter 120. One disadvantage of MMSE filter 120 is that its filter coefficients vary when the channel changes. A need continues to exist for an improved method and system for estimating a communication channel.

BRIEF SUMMARY OF THE INVENTION

A method of compensating for roll-off while estimating a communication channel, includes, in part, receiving a signal transmitted via the communication channel, providing an estimate of the channel using the received signal, dividing pilot tones positioned along the edges of the estimated channel by corresponding pilot tones of the received signal to generate a first number of ratios, applying an algorithm to the first number of ratios to generate a second number of ratios associated with the non-pilot tones positioned along the edges of the estimated channel, and applying inverse of the first and second number of ratios to the pilot and non-pilot tones positioned along the edges of the estimated channel to compensate for the roll-offs in the estimated channel.

In one embodiment, the interpolation is a linear interpolation. In one embodiment, the frequency spectrum that includes the edge tones is predefined. In another embodiment, the frequency spectrum that includes the edge tones is dynamically determined.

A channel estimation block operative to estimate a communications channel includes, in part, a receiver receiving a signal transmitted via the communication channel, a channel estimation block operative to provide an estimate of the channel using the received signal, a computation block operative to divide pilot tones positioned along the edges of the estimated channel by corresponding pilot tones of the received signal to generate a first number of ratios, an interpolator operative to apply an interpolation scheme to the first number of ratios to generate a second number of ratios associated with the non-pilot tones positioned along the edges of the estimated channel; and a correction block operative to apply inverse of the first and second number of ratios to the pilot and non-pilot tones of the edges of the estimated channel to compensate for roll-offs and equalize the edge tones.

In one embodiment, the interpolator performs linear interpolation. In one embodiment, the frequency spectrum defined as including the edge tones is predefined. In another embodiment, the frequency spectrum defined as including the edge tones is dynamically determined.

DETAILED DESCRIPTION OF THE INVENTION

Figure 1:
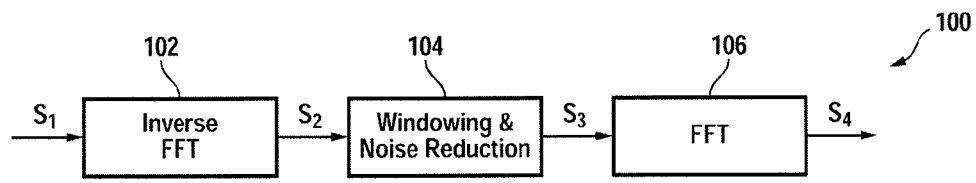
FIG. 1 shows a number of blocks of a channel estimation system that uses FFT to estimate the channel, as known in the prior art.
Figure 2:
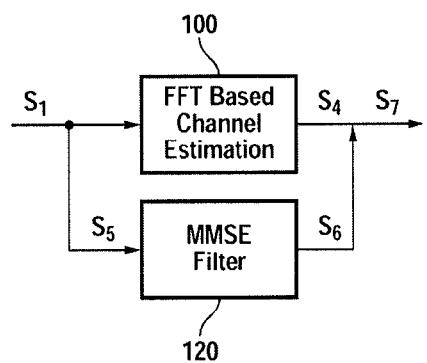
FIG. 2 shows a channel estimation system in communication with an MMSE filter, as known in the prior art.
Figure 3:
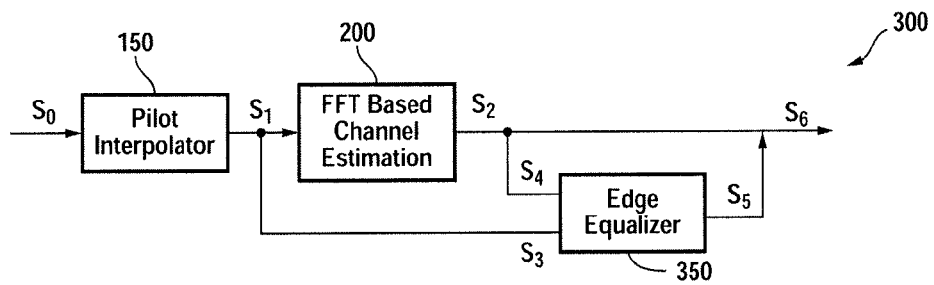
FIG. 3 is a block diagram of a channel estimation system, in accordance with one embodiment of the present invention.

FIG. 3 is a block diagram of a channel estimation system (herein alternatively referred adapted to as system) 300 adapted to estimate the channel of a communication systems, in accordance with one exemplary embodiment of the present invention. Exemplary Channel estimation system 300 is shown as including, in part, a pilot interpolator 150, an FFT-based channel estimation block 200 and an edge equalizer 350. FFT-based channel estimation block 200 receives signal $S_1$ from pilot interpolator 150 which performs an interpolation algorithm to increase the density of the pilot tones $S_0$ it receives. In response FFT-based channel estimation block 200 generates channel estimate signal $S_2$ that has a roll-off near the edges of its signal band. Signal $S_3$ represents the edge pilot tones (alternatively referred to herein as pilot tones) of signal $S_1$, and signal $S_4$ represents the similarly positioned (corresponding) edge tones of signal $S_2$.

Figure 5A:
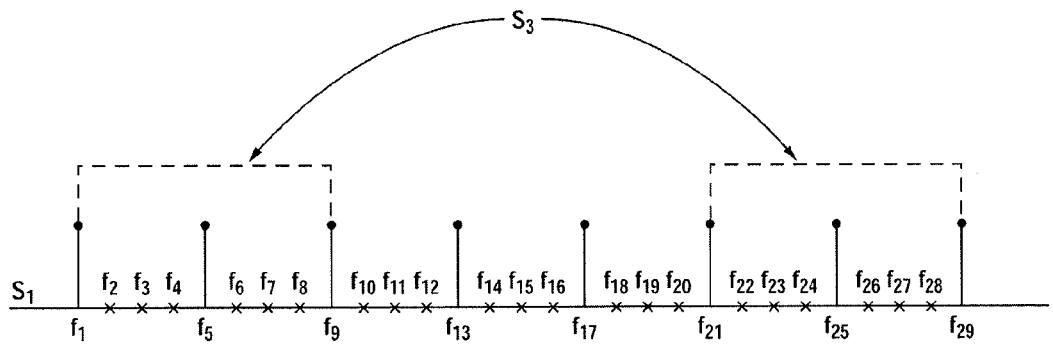
FIG. 5A is an exemplary spectrum of an input signal of a channel estimation block under ideal conditions, and exhibiting no roll-offs along the signal edges.
Figure 5B:
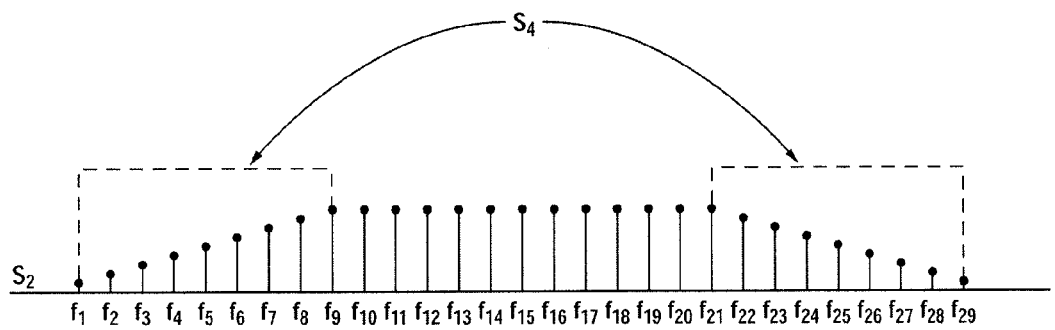
FIG. 5B is an exemplary spectrum of an output signal of a channel estimation block under practical conditions.

FIGS. 5A and 5B are exemplary spectrums of signals $S_1$ and $S_2$ respectively. As is shown, signal spectrum $S_1$ has pilot tones at frequencies $f_1$, $f_5$, $f_9$, $f_{13}$, $f_{17}$, $f_{21}$, $f_{25}$ and $f_{29}$. The pilot tones at other frequencies of signal $S_1$ are assumed to be zero. Signal spectrum $S_2$ has pilot tones at all shown frequencies $f_1$-$f_{29}$. For the example shown in FIGS. 5A-5B only tones $f_1$-$f_9$ and $f_{21}$-$f_{29}$ are considered as edge tones. Therefore, in this example, edge tones $f_1$-$f_9$ and $f_{21}$-$f_{29}$ of FIG. 5A represent signal $S_3$, and edge tones $f_1$-$f_9$ and $f_{21}$-$f_{29}$ of FIG. 5B represent signal $S_4$. It is understood that the edge tones may cover a wider or narrower range of frequencies in other examples. As is shown, signal $S_3$ does not have any roll-offs along the edges of its signal band. In other words, tones $f_1$, $f_5$, $f_9$, $f_{13}$, $f_{17}$, $f_{21}$, $f_{25}$ and $f_{29}$ of signal $S_1$ (which form signal $S_3$ of FIG. 3) have similar values, assuming that the channel is flat in frequency domain in this example. The edge tones $f_1$-$f_8$ and $f_{22}$-$f_{29}$ of signal $S_2$ (which form signal $S_4$ of FIG. 3) however, have roll-offs and thus have smaller values than their corresponding tones of signal $S_1$. In other words, edge tones $f_1$-$f_8$ and $f_{22}$-$f_{29}$ of signal $S_2$ have values that are smaller than the corresponding values of the edge tones $f_1$-$f_8$ and $f_{22}$-$f_{29}$ of signal $S_1$.

Figure 4:
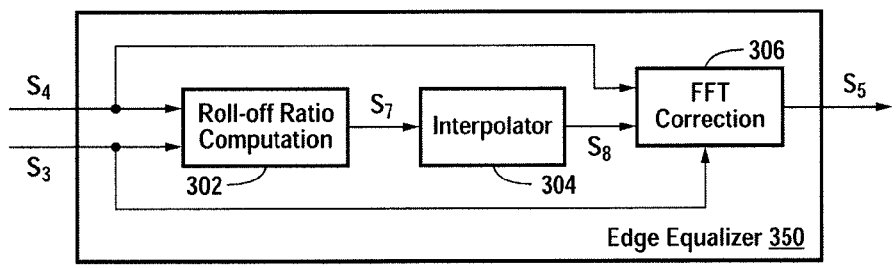
FIG. 4 shows a number of blocks of the edge equalizer of FIG. 3, in accordance with one embodiment of the present invention.

Edge equalizer 350 compares the corresponding edge tones of signals $S_1$ and $S_2$ to determine their ratios, and in response, generates signal $S_5$ whose tones are compensated by the ratios so determined. For the example shown in FIGS. 5A and 5B, signal $S_6$ includes tones $f_1$-$f_9$ and $f_{21}$-$f_{29}$ of signal $S_5$ and tones $f_{10}$-$f_{20}$ of signal $S_2$. FIG. 4 is a block diagram of edge equalizer 350 which is shown as including a roll-off ratio computation block 302, an interpolation block 304, and an FFT correction block 306, as described further below.

Roll-off ratio computation block 302 is adapted to compute a number of ratios defined by pilot tones of signals $S_4$ and $S_3$. To achieve this, referring to FIGS. 5A and 5B, roll-off ratio computation block 302 divides pilot tones $f_1$, $f_5$, $f_9$, $f_{21}$, $f_{25}$, $f_{29}$ of signal $S_4$ by corresponding pilot tones $f_1$, $f_5$, $f_9$, $f_{21}$, $f_{25}$, $f_{29}$ of signal $S_3$ to determine their roll-off ratios. It is understood that these ratios may be different depending on the position of the pilot tones in the frequency spectrum. Referring to FIGS. 5A and 5B, the ratio for pilot tones $f_1$ and $f_{29}$ may be, for example, 1/3, and the ratio for pilot tones $f_5$ and $f_{25}$ may be, for example, 1/2. These ratios are represented in signal $S_7$ generated by roll-off ratio computation block 302.

Interpolation block 304 applies an interpolation algorithm, such as linear interpolation or otherwise, to the roll-off ratios associated with the pilot tones, to interpolate and thus obtain the roll-off ratios for non-pilot tones. Referring to the example shown in FIGS. 5A-5B, interpolation block 304 uses the roll-off ratios for pilot tones $f_1$, $f_5$, $f_9$, $f_{21}$, $f_{25}$, $f_{29}$ to interpolate the roll-off ratios for non-pilot tone $f_2f_4$, $f_6f_8$, $f_{22}$-$f_{24}$, $f_{26}$-$f_{28}$ of signal $S_4$. Accordingly, the roll-off ratios for tones $f_2$-$f_4$ and $f_{26}$-$f_{28}$ are interpolated by interpolation block 304 to be between 1/3 and 1/2. Likewise, the roll-off ratios for tones $f_6$-$f_8$ and $f_{22}$-$f_{24}$ are interpolated by interpolation block 304 to be between 1/2 and 1. The roll-off ratio for tones $f_9$ and $f_{21}$ is determined to be equal to 1 in this example. Output signal $S_8$ of interpolation block 304 represents the roll-off ratios for the pilot and interpolated tones.

The FFT correction block 306 multiplies the inverse of the roll-off ratios disposed in signal $S_8$ by the edge tones of signal $S_4$ to obtain channel compensated estimates $S_5$ of the edge tones. Signal $S_6$ includes a frequency spectrum that includes the non-edge tones of signal $S_2$ as well as the channel compensated edge tones of signal $S_5$.

Figure 6:
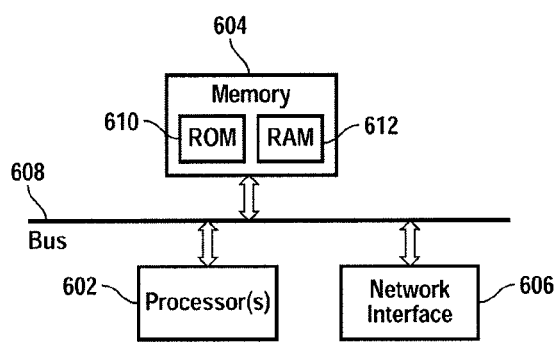
FIG. 6 is a block diagram of the edge equalizer of FIG. 3, in accordance with another exemplary embodiment of the present invention.

In some embodiments, compensating for the roll-off of the tones positioned near the edges of a signal band is performed using software instructions executed by a central processing unit of a computer system. FIG. 6 shows a computer system having disposed therein, in part, processor 602, memory 604, and network interface 606, that communicate with one another using bus 608. Memory 604 is shown as including ROM 610 and RAM 612.

Network interface subsystem 606 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 606 serves as an interface for receiving data from other sources and for transmitting data to other sources.

Memory 604 may be configured to store the basic programming and data constructs that provide the functionality in accordance with embodiments of the present invention. For example, according to one embodiment of the present invention, software modules implementing the functionality of the present invention may be stored in memory 604. These software modules may be executed by processor(s) 602. Memory 604 may also provide a repository for storing data used in accordance with the present invention. Memory 604 may include a number of memories including a random access memory (RAM) 612 for storage of instructions and data during program execution and a read only memory (ROM) 610 in which fixed instructions are stored.

The above embodiments of the present invention are illustrative and not limitative. Various alternatives and equivalents are possible. The invention is not limited by the type of channel estimation, interpolation, etc. used. The invention is not limited by the number of pilot tones in each symbol. Nor is the invention limited by the number of tones considered as being located along the edges of a signal band. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A method of compensating for roll-off while estimating of a communication channel, the method comprising:
   receiving a signal transmitted via the communication channel, the received signal having a frequency spectrum including non-pilot tones and edge pilot tones;
   providing an estimate of the channel using the received signal;
   dividing the edge pilot tones of the estimated channel by corresponding edge pilot tones of the received signal to generate a first plurality of ratios;
   applying an interpolation scheme to the first plurality of ratios to generate a second plurality of ratios associated with the non-pilot tones positioned along the edges of the estimated channel; and
   applying inverse of the first and second plurality of ratios to the edge pilot tones and to the non-pilot tones of the edges of the estimated channel to compensate for roll-offs in the estimated channel, wherein the frequency spectrum is predefined.

2. The method of claim 1 wherein said interpolation is linear interpolation.

3. The method of claim 1 wherein the frequency spectrum is dynamically determined.

4. The method of claim 1 further comprising:
interpolating the edge pilot tones to increase a density of the edge pilot tones.

5. A channel estimation block comprising a processor operative to estimate a communications channel said processor adapted to, the channel estimation block comprising:
receive a signal transmitted via the communication channel, the received signal having a frequency spectrum including non-pilot tones and edge pilot tones;
provide an estimate of the channel using the received signal;
divide the edge pilot tones of the estimated channel by corresponding edge pilot tones of the received signal to generate a first plurality of ratios;
apply an interpolation scheme to the first plurality of ratios to generate a second plurality of ratios associated with the non-pilot tones positioned along the edges of the estimated channel; and
apply inverse of the first and second plurality of ratios to the edge pilot tones and the non-pilot tones of the edges of the estimated channel to compensate for roll-offs in the estimated channel, wherein the frequency spectrum is predefined.

6. The channel estimation block of claim 5 wherein said processor further adapted to perform linear interpolation.

7. The channel estimation block of claim 5 wherein the frequency spectrum is dynamically determined.

8. The channel estimation block of claim 5 wherein said processor further adapted to:
increase a density of the edge pilot tones.

* * * * *